United States Patent [19]
Ryu et al.

[11] Patent Number: 6,077,881
[45] Date of Patent: Jun. 20, 2000

[54] INK COMPOSITION FOR INK-JET PRINTER

[75] Inventors: Seung-min Ryu, Kunpo; Seong-jin Kim, Sungnam, both of Rep. of Korea

[73] Assignee: Samsung Electronics Co., Ltd., Kyungki-do, Rep. of Korea

[21] Appl. No.: 09/009,896

[22] Filed: Jan. 21, 1998

[30]     Foreign Application Priority Data

Jan. 21, 1997 [KR] Rep. of Korea ................. 97-1634
Jan. 16, 1998 [KR] Rep. of Korea ................. 98-1222

[51] Int. Cl.$^7$ .................. C09D 11/02; C09D 11/10; C09D 139/00; C09D 133/24
[52] U.S. Cl. .................. 523/160; 523/161; 106/31.6
[58] Field of Search .................. 523/160, 161; 106/31.6, 31.89

[56]             References Cited

U.S. PATENT DOCUMENTS

| 4,221,911 | 9/1980 | Schwander | 544/354 |
| 5,531,818 | 7/1996 | Lin et al. | 106/31.28 |
| 5,714,526 | 2/1998 | Whyzmuzis | 523/161 |
| 5,772,746 | 6/1998 | Sawada et al. | 106/31.86 |
| 5,833,744 | 11/1998 | Breton et al. | 106/31.59 |
| 5,883,157 | 3/1999 | Yamashita et al. | 523/161 |

FOREIGN PATENT DOCUMENTS 08143803  6/1996  Japan .

*Primary Examiner*—Vasu Jagannathan
*Assistant Examiner*—Callie E. Shosho
*Attorney, Agent, or Firm*—Eugene M. Lee, Esq.; Kile, McIntyre, Harbin & Lee

[57]             ABSTRACT

An ink composition for an ink jet printer. The ink composition contains an oligomeric dispersant, a pigment and a solvent. The oligomeric dispersant simultaneously has a hydrophilic group capable of interacting with water soluble solvent and an anchoring group capable of interacting with the pigment. The ink composition provides good printing properties, water fastness, light fastness and storage stability, by using less amount of dispersant.

20 Claims, No Drawings

INK COMPOSITION FOR INK-JET PRINTER

BACKGROUND OF THE INVENTION

1. Field of the Invention

The present invention relates to an ink composition for an ink-jet printer, and more particularly, to an ink composition for an ink-jet printer exhibiting improvement in properties such as water fastness, light fastness and storage stability while containing less dispersant compared to conventional ink compositions.

2. Description of the Related Art

Ink jet printing is most commonly performed by a thermal bubble ink jet printing or a piezoelectric bubble ink jet printing method.

According to the thermal bubble ink jet method, when ink is heated to above its boiling point by a heating unit of the print head, bubbles are generated. The bubbles are then grown to form larger bubbles. When such larger bubbles are formed, pressure is applied to the surrounding ink, and printing is achieved while the ink is discharged through an ink discharge hole due to the pressure.

In the piezoelectric bubble ink jet printing method, when a voltage is applied to a piezoelectric unit, a change in ink volume is effected. Pressure is generated by the change in ink volume change, and this pressure is applied to the ink. Printing is achieved while the ink is discharged through an ink discharging hole due to the pressure.

An ink composition for an ink jet printer is composed of a coloring agent such as a dye or a pigment, water, and additives such as an absorbent. When a dye is used as a coloring agent, it is difficult to select a dye to be printed in a desired color, and the resultant ink has a limitation in use due to its poor water fastness and light fastness. When a pigment is used as a coloring agent, water fastness and light fastness are improved as compared to when a dye is used.

When an ink composition is made using a pigment as the coloring agent, pigment particles tend to aggregate hydrophilically due to the van der Waals' force during a drying process. Such aggregation of pigment particles may block the nozzle or ink discharge holes of a printer head. Thus, it is very important to pre-grind the pigment in order to avoid such a phenomenon. Generally, as the particle size of the pigment particles is decreased, color strength, glossiness, brightness and transparency improve. That is, print resolution is enhanced.

However, even when the pigment agglomerate is ground, the ground pigment particles tend to aggregate again. Thus, it is necessary to perform a dispersion process for preventing reaggregation of the ground particles by minimizing the total surface energy. The pigment after the dispersion process can be stabilized by electrical stabilization, steric stabilization using a stabilizing agent, or electro-steric stabilization. Also, in the case of dispersing the pigment, the steric stabilization method has been commonly adopted since steric stabilization is affected less by electrolytes than the electric stabilization which is affected by whether or not the electrolytes are contained in a dispersion medium.

Conventionally, a polymeric dispersing agent has been used as a dispersing agent. The polymeric dispersing agent is a copolymer having both hydrophilic and hydrophobic groups, wherein the hydrophobic group stabilizes the dispersion of the pigment by an interaction with the pigment, and the hydrophilic group interacts with a water soluble solvent to provide steric stability.

However, due to its high molecular weight, physical properties (e.g., viscosity) of the ink composition changes considerably even if the change in the amount of polymeric dispersing agent added is small. Thus, it is very difficult to accurately control the amount of dispersing agent during the manufacture of the ink composition. Also, even if the polymeric dispersing agent contains hydrophilic groups, mole fraction of the hydrophilic group to the whole compound is low, so that its solubility in water is poor. Thus, it takes a long time to dissolve the polymeric dispersing agent in water. Also, when water of the ink composition near a nozzle evaporates, the polymer is precipitated due to its lower solubility in water, thereby blocking the nozzle. In order to prevent such an undesirable phenomenon, a wetting agent is necessary. However, using a wetting agent extends the amount of time required to dry the ink on paper.

SUMMARY OF THE INVENTION

To solve the above problems, it is an object of the present invention to provide an ink composition for an ink jet printer, which can be manufactured easily and which is improved in properties such as light fastness, water fastness, and storage stability.

To achieve the above object, there is provided an ink composition for an ink jet printer, comprising a coloring agent, a dispersant and a solvent, wherein the coloring agent is a pigment and the dispersant is an BAB' type (including A, B and B' portions) oligomer, at least one of the B and B' portions, as a repeating unit, represents a hydrophilic group, and the B and B' portions are represented by the following formulae (1) and (2), respectively:

$$J_1\text{---}(D\text{---}E)_a \quad (1)$$

$$(F\text{---}L)_b\text{---}J_2 \quad (2), \text{ and}$$

the A portion, as a single component without repetition or a repeating unit, represents an anchoring group interacting with the pigment, and the A portion is represented by the following formula (3):

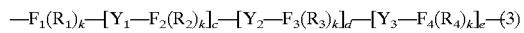

$$\text{---}F_1(R_1)_k\text{---}[Y_1\text{---}F_2(R_2)_k]_c\text{---}[Y_2\text{---}F_3(R_3)_k]_d\text{---}[Y_3\text{---}F_4(R_4)_k]_e\text{---}(3)$$

where E, F, $Y_1$, $Y_2$, $Y_3$, $R_1$, $R_2$, $R_3$ and $R_4$ are independently selected from the group consisting of hydrogen, unsubstituted or substituted $C_1$~$C_{30}$ aliphatic hydrocarbon group with at least one substituent (G), unsubstituted or substituted $C_f$~$C_{30}$ heteroaliphatic hydrocarbon group with at least one substituent (G), unsubstituted or substituted sugars with at least one substituent (G), unsubstituted or substituted sorbitan with at least one substituent (G), unsubstituted or substituted $C_6$~$C_{50}$ aromatic hydrocarbon group with at least one substituent (G), and unsubstituted or substituted steroids with at least one substituent (G);

D, L, $F_1$, $F_2$, $F_3$ and $F_4$ are independently selected from the group consisting of aliphatic hydrocarbon, aromatic hydrocarbon, —N—, —NH—, —NH$_2$—, —O—, —S—, —O—O—, —S—S—, —C(O)—, —C(S)—, —C(O)—C(O)—, —C(O)—O—, —O—C(O)—, —C(NH)—, —N—C(O)—, —C(O)—N—, —O—C(O)—O—, —N—C(O)—N—, —N—C(O)—O—, —O—C(O)—N—, —O—C(O)—O—, —S(O)—, —S(O)(O)—, —S(O)—O—, —O—S(O)—, —S(O)(O)—O—, —O—S(O)(O)—, —S(O)—N—, —N—S(O)—, —S(O)(O)—N—, —N—S(O)(O)—, —O—S(O)—O—, —O—S(O)(O)—O—, —N—S(O)—N—, —N—S(O)(O)—N—, —O—S(O)—N—, —N—S(O)—O—, —O—S(O)(O)—N—, —N—S(O)(O)—O—, —O—S(O)—S(O)—O—, —O—S(O)(O)—S (O)(O)—O—, —N—S(O)—S(O)—N—, —N—S(O)(O)—S—(O)(O)—N—, —P—, —P(O)(OH)—, —O—P(O)(OH)—P(O)(OH)—O—, —O—P(O)(OH)—P(O)(OH)—P(O)(OH)—O—, —O—P(O)(OH)—O—P(O)(OH)—O—, —O—P(O)(OH)—O—P(O)(OH)—O—P(O)(OH)—O—, and $NH_4OH$;

$J_1$ and $J_2$ are independently selected from the group consisting of hydrogen, aliphatic hydrocarbon group substituted by —OH, —SH, polyol, amine, ammonium halide, ammonium hydroxide, acidic group or alkali salt of the acid, heteroaliphatic hydrocarbon group substituted by —OH, —SH, polyol, amine, ammonium halide, ammonium hydroxide, acidic group or alkali salt of the acid, and aromatic hydrocarbon group substituted by —OH, —SH, polyol, amine, ammonium hydroxide, ammonium halide, acidic group or alkali salt of the acid; and the substituent (G) of the A, B and B' portions is at least one selected from the group consisting of unsubstituted or substituted $C_f$-$C_{20}$ aliphatic hydrocarbon group with oxy group, amino group or thio group, unsubstituted or substituted $C_1$~$C_{20}$ heteroaliphatic hydrocarbon group with oxy group, amino group or thio group, unsubstituted or substituted $C_6$~$C_{50}$ aromatic hydrocarbon group with oxy group, amino group or thiol group, halide, —OH, —O—, —SH—, —S—, —CN, —SCN, —$NO_2$, —$NH_2$, —NH—, —N—, ammonium hydroxide, ammonium halide, —C=NH, —C=N—, amidino group, —N=NH, —N=N—, hydrazone, substituted hydrazone, amide group, substituted amide group, sulfonamide group, carboxyl group (—COOH), alkali salt of carboxylic acid ($COO^-M^+$), sulfonic acid ($SO_3H$), alkali salt of the sulfonic acid ($SO_3^-M^+$), phosphoric acid ($H_3PO_4$) and alkali salt of the phosphoric acid ($H_2PO_4^-M^+$), where M is an alkaline metal, and k is 0, 1 or 2, varying depending on $F_1$, $F_2$, $F_3$ and $F_4$, and the following conditions are satisfied:

$0 \leq a \leq 30$, $0 \leq b \leq 30$, $0 \leq c \leq 30$, $0 \leq d \leq 30$, $0 \leq e \leq 30$ and $0 < a+b+c+d+e < 60$, wherein the molecular weight of the oligomer is 300~3,000.

Preferably, the A portion of the dispersant is selected from the group consisting of unsubstituted or substituted $C_6$~$C_{18}$ aliphatic hydrocarbon group with at least one substituent (G), and unsubstituted or substituted $C_6$~$C_{50}$ aromatic hydrocarbon group with at least one substituent (G), the B and B' portions are ethyleneglycol having a heteroatom.

DESCRIPTION OF THE PREFERRED EMBODIMENTS

As described above, an oligomeric dispersant of the present invention includes one or more functional groups, which further increases interaction with a pigment and a hydrophilic group (B and/or B' portions), which increases solubility of the dispersant and improves stability of the pigment dispersed in a solution. Thus, an ink composition, having improved water fastness, light fastness and storage stability, can be obtained with less amount of dispersant compared to conventional ink compositions.

In the ink composition according to the present invention, a pigment is stably dispersed in a solvent by an oligomeric dispersant having an anchoring group (A portion) and a hydrophilic group (B and/or B' portions). In the oligomeric dispersant, the anchoring group improves reactivity, e.g., chemical affinity, with the pigment. In order to increase adsorption of the dispersant, a substituent such as an acidic or alkali group, thiol group, cyano group, isocyano group, methoxy group and nitride may be introduced to the anchoring group.

The above-described oligomer having the anchoring and the hydrophilic groups can be formed by the following two methods.

First, a hydrophilic group and an anchoring group can be simultaneously introduced into an oligomer through a substitution reaction between an oligomer having the hydrophilic group and a compound having the anchoring group.

Second, after reacting a compound having an anchoring group with a compound having a hydrophilic group, the resultant product is polymerized, resulting in an oligomer.

The oligomeric dispersant obtained by the above methods is easily dissolved in water, thereby making the dispersion of pigment easy.

As a result, due to the even dispersion of pigment, precipitation of the oligomeric dispersant as a result of water evaporation is sharply decreased, unlike the polymeric dispersant which is easily precipitated at the nozzle when the water in the ink composition evaporates. When using such an oligomeric dispersant, blockage of the nozzle is sharply decreased, and the whole structure of the dispersed pigment is simplified as the size thereof is relatively small. Thus, the flow of pigment ink within a printer head becomes easy, so that high speed printing can be achieved.

In order to improve the dispersion effect of the oligomeric dispersant, two or more dispersants can be used according to the pigment.

Preferably, the molecular weight of the oligomeric dispersant is 300~3,000, and the content of the oligomeric dispersant is 0.1~20 wt % based on the total weight of the ink composition, preferably, 0.5~15 wt %.

An inorganic pigment and an organic pigment are used as a coloring agent. The particle size of the pigment affects the stability of dispersion, color strength and glossiness of the ink. Thus, it is preferable that the size of the pigment particles is small enough to pass through a nozzle having a diameter of between about 10~50 μm.

Preferably, the content of the pigment is 0.1~20 wt % based on the total weight of the ink composition, and more preferably, 0.5~15 wt %. Preferably, the pigment is selected from compounds having a functional group capable of actively reacting with the anchoring group of the dispersant.

The ink composition of the present invention may further include an acid or a base. Here, the acid or base increases the solubility of the oligomeric dispersant and stabilizes the dispersed pigment. The content of the acid or base is between about 0.1~20 wt % based on the weight of the dispersant.

There is no particular limitation in the kind of acid. Preferably, the acid is selected from the group consisting of $C_1$~$C_{30}$ aliphatic hydrocarbon carboxylic acid, $C_{1~C30}$ heteroaliphatic hydrocarbon carboxylic acid, $C_6$~$C_{50}$ aromatic hydrocarbon carboxylic acid, $C_1$~$C_{30}$ aliphatic hydrocarbon sulfonic acid, $C_1$~$C_{30}$ heteroaliphatic hydrocarbon sulfonic acid, $C_6$~$C_{50}$ aromatic hydrocarbon sulfonic acid, $C_1$~$C_{30}$ aliphatic hydrocarbon phosphoric acid, $C_1$~$C_{30}$ heteroaliphatic hydrocarbon phosphoric acid, $C_6$~$C_{50}$ aromatic hydrocarbon phosphoric acid or sulfuric acid.

Also, there is no limitation in the kind of base. Preferably, the base is selected from the group consisting of $C_1$~$C_{30}$ aliphatic hydrocarbon amine, $C_6$~$C_{50}$ aromatic hydrocarbon amine, $C_1$~$C_{20}$ aliphatic mono-, di-, tri-, polyalkanol amine, and $C_6$~$C_{50}$ aromatic mono-, di-, tri-, polyalkanol amine. In detail, the base is one selected from the group consisting of dimethylethanol amine, methyldiethanol amine, $RNH_2$, $R_2NH$, $R_3N$ (where R is selected from the group consisting of $C_{1-C_{20}}$ alkyl, $CH_2OH$ and $CH_2CH_2OH$), ammonium hydroxide, tetralkylammonium hydroxide, dimethylaminoprolamine (DMAP), dimethylaminoprolpyl-2-pyrrolidone (DMAPP), laurylamine, cetrimonium bromide, morpholine and n-methylmorpholine.

The content of solvent is 60–99.8% based on total weight of the ink composition. Here, water is mainly used as the solvent. If required, a mixture of water and organic solvent is used in order to improve the solubility of the oligomeric dispersant and to appropriately control the viscosity and surface tension of the ink composition. Preferably, the content of organic solvent is 0.1–20 wt % based on total weight of the solvent.

In the present invention, there is no limitation in the kind of organic solvent that may be used. Preferably, the organic solvent may be an alcohol such as methanol, ethanol, etc.; a polyhydric alcohol such as ethylene glycol, propylene glycol, etc.; tetrahydrofuran, dioxane; ethylene glycol monomethylethylether, diethylene glycol monomethylethyl ether, triethylene glycol monomethylpropylether, propylene glycol monomethylethylether, dipropylene glycol dimethyldiethylether; ethylacetate; ethylene carbonate; propylene glycol laurylate, ethylene glycol monomethylethylether acetate; diethylene glycol monomethylethyl ether acetate, propylene glycol monomethyl ethyl ether acetate, dipropyleneglycolmonomethylethylether acetate; lactone including γ-butylolactone; lactames including 2-pyrrolidone, N-pyrrolidone, N-(2-hydroxyethyl)pyrrolidone, N-methyl-2-pyrrolidone and 1,3-dimethyl-2-imidazolidinone; ketones including cellosolve, methylethylketone and acetone; a sulfur-containing organic solvent including sulfolane, dimethylsufoxide and tetramethylene sulfone; or a carbohydrocarbon solvent selected from hexane, cyclohexane and toluene.

The ink composition according to the present invention is formed by the following method.

Water and an oligomeric dispersant are added to ink and mixed. If required, an organic solvent is added thereto. A pigment is then added to the mixture followed by dispersing, thereby preparing a high-concentrated ink composition. Physical properties of the composition, such as viscosity, surface tension, hue, lightness, etc., are appropriately controlled for the ink jet printer after diluting the high-concentrated ink composition.

Hereinafter, examples of the ink composition according to the present invention will be described. However, the present invention is not limited to the following examples.

Evaluation of the ink compositions manufactured by the following examples and comparative examples were performed as follows, and the results are shown in Table 2.

(1) Storage stability

After putting 100 ml of ink into a heat-resistant glass bottle, the glass bottle is sealed and then stored in an incubator at 60° C. for 2 months. Then, printing is performed using the ink. In Table 2, "O" represents good ejectability or no discoloration, and "x" represents poor ejectability of ink or discoloration.

(2) Optical Density (O.D.)

Optical density of the printed output is measured by using a reflectodensitometer. The average O.D. of yellow, cyan, magenta and black is graded as follows. In Table 2, "O" represents O.D. of 1.0 or higher. "Δ" represents O.D. of 0.9~1.0, and "x" represents O.D. of lower than 0.9.

(3) Bleeding

After preparing a printed output with two different color bars which are adjacent to each other, the number of occurrences of bleeding of each color is counted. Here, two colors are selected from black, yellow, cyan, magenta, red, green and blue. In Table 2, "O" represents the case without bleeding at the boundaries of each color bar, "Δ" represents the case where bleeding is shown at the boundaries of red, green and blue when an abundant amount of ink is used, and "x" represents the case where bleeding is shown at the boundaries of all color bars.

(4) Ejectability or Maintenance

Ink cartridges are left standing and idle for 6 hours, 4 days, 7 days and 30 days, respectively, and thereafter are tested to determine the smoothness of ejection of the ink. In Table 2, "O" represents good ejectability even after 30 days, "Δ" represents blockage of nozzle after 7 days, "□" represents blockage of nozzle after 4 days, "●" represents blockage of nozzle after 6 hours, and "x" represents immediate blockage of nozzle.

(5) Water fastness

The degree of ink being diffused into water when a printed output is soaked in water is investigated. In Table 2, "O" represents less than 10% change of O.D., "Δ" represents 10~30% change in O.D., and "x" represents 30% or more change in O.D.

(6) Light fastness

After leaving a printed output standing and idle under an ultraviolet (UV) lamp (about 254 nm), the degree of discoloration is observed. In Table 2,"O" represents less than 5% change in O.D., "Δ" represents 5~20% change in O.D., and "x" represents 20% or more change in O.D.

(7) Reliability of printer head

Using a microscope, it is determined whether or not kogation occurs on a printer head when 500 ml or more ink is used in one ink cartridge. In Table 2,"O" represents the case without kogation, and "x" represents the case with kogation.

EXAMPLE 1

A mixture including 5.20 part by weight (hereinafter, referred to as "part") of ethyleneglycol lauryl amine, 6.00 part of methanol and 17.80 part of water, was stirred for about 15 minutes to prepare an oligomeric dispersant solution.

5.00 part of pigment (Monastral Magenta, Ciba-Geigy), 16.00 part of ethylene glycol and 20.00 part of water, were added to the oligomeric dispersant solution and mixed thoroughly. Then, the mixture was diluted by adding 30.00 part of water.

The resultant composition was filtered and used as an ink composition for an ink jet printer.

EXAMPLE 2

4.50 part of ethyleneglycol 1,1'-bi-2-naphthyl ether, 5.00 part of methanol and 15.50 part of water were mixed for about 30 minutes to prepare an oligomeric dispersant solution.

6.50 part of carbon black (Special 4A, Degussa), 15.00 part of ethyleneglycol, 3.50 part of carbowax, and 20.00 part of water were added to the oligomeric dispersant solution, and then mixed. Then, the resultant mixture was diluted by adding 30.00 part of water.

The resultant composition was filtered and used as an ink composition for an ink jet printer.

EXAMPLE 3

4.50 part of ethyleneglycol 2-naphthyl amine, 5.00 part of n-propanol and 15.50 part of water were mixed for about 30 minutes to prepare an oligomeric dispersant solution.

7.00 part of pigment(Heliogen Blue K 7090, BASF), 15.00 part of ethylene glycol, 1.00 w % of carbowax and 22.00 part of water were added to the oligomeric dispersant solution and then mixed. Then, the resultant mixture was diluted by adding 30.00 part of water.

The resultant composition was filtered and used as an ink composition for an ink jet printer.

EXAMPLE 4

2.00 part of ethyleneglycol 1-naphthalene acetamide, 3.00 w % of ethyleneglycol benzene sulfonamide, 4.00 part of ethanol, and 14.00 part of water were mixed for about 15 minutes to prepare an oligomeric dispersant solution.

7.50 part of pigment (Hostaperm Yello, Hochest), 15.00 part of ethylene glycol, 2.50 part of carbowax, and 20.00 part of water were added to the oligomeric dispersant solution, and then mixed. Then, the resultant mixture was diluted by adding 30.00 part of water.

The resultant composition was filtered and used as an ink composition for an ink jet printer.

EXAMPLE 5

2.50 part of ethyleneglycol N,N'-dipropyl propyl-1,3-diamine, 7.00 part of n-butanol and 15.50 part of water were mixed for about 15 minutes to prepare an oligomeric dispersant solution.

6.50 part of pigment (Heliogen Green K 8683, BASF), 15.00 part of ethyleneglycol, 2.50 w % of carbowax and 21.00 part of water were added to the oligomeric dispersant solution and then mixed. Then, the resultant mixture was diluted by adding 30.00 part of water.

The resultant composition was filtered and used as an ink composition for an ink jet printer.

EXAMPLE 6

2.00 part of hydroxyhexylthio-poly(N-isopropyl propyl amino)-poly(N-propylethylene aminoglycol) butylphosphoric acid, 5.00 w % of n-butanethiol and 18.00 part of water were mixed for about 15 minutes to prepare an oligomeric dispersant solution.

5.50 part of Indofast Violet (Mobay), 2.50 part of carbowax and 22.00 part of water were added to the oligomeric dispersant solution, and then mixed. Then, the resultant mixture was diluted by adding 30.00 part of water.

The resultant composition was filtered and used as an ink composition for an ink jet printer.

COMPARATIVE EXAMPLE 1

8.00 part of a copolymer of methacrylic acid and n-butylacrylate [P(MAA/n-BA)], 0.50 part of dimethylaminoethanol (DMAE), 8.00 part of methanol and 13.00 part of water were mixed for about 15 minutes to prepare a polymeric dispersant solution.

5.00 part of azomethione (Pigment yellow, BASF), 2.50 part of carbowax, 15.00 part of ethylene glycol and 20.00 part of water were added to the polymeric dispersant solution, and then mixed. Then, the resultant mixture was diluted by adding 30.00 part of water.

The resultant composition was filtered and used as an ink composition for an ink jet printer.

COMPARATIVE EXAMPLE 2

7.00 part of P(MAA/n-BA), 0.50 part of DMAE, 8.00 part of methanol and 14.50 part of water were mixed for about 30 minutes to prepare a polymeric dispersant solution.

5.00 part of phthalocyanine blue (ICI), 15.00 part of ethylene glycol and 20.00 part of water were added to the polymeric dispersant solution. Then, the resultant mixture was diluted by adding 30.00 part of water.

The resultant composition was filtered and used as an ink composition for an ink jet printer.

COMPARATIVE EXAMPLE 3

8.00 part of P(MAA/n-BA), 0.50 part of DMAE, 8.00 part of ethanol and 13.50 part of water were mixed for about 15 minutes to prepare a polymeric dispersant solution.

5.00 part of azomethione (Pigment Yellow, BASF), 14.00 part of ethyleneglycol, 2.00 part of carbowax and 19.00 part of water were added to the polymeric dispersant solution. Then, the resultant mixture was diluted by adding 30.00 part of water.

The resultant composition was filtered and used as an ink composition for an ink jet printer.

The pH, viscosity and surface tension of the ink compositions obtained by the Examples 1 through 6 and Comparative Examples 1 through 3 were measured, and the results were tabulated as shown in Table 1.

TABLE 1

| class | pH | viscosity (cp) | surface tension (dyne/cm) |
|---|---|---|---|
| Example 1 | 6.7 | 3.1 | 50 |
| Example 2 | 8.4 | 2.8 | 48 |
| Example 3 | 7.8 | 3.4 | 46 |
| Example 4 | 7.2 | 3.2 | 50 |
| Example 5 | 6.7 | 3.1 | 51 |
| Example 6 | 7.9 | 3.0 | 50 |
| Comparative Example 1 | 8.9 | 4.5 | 59 |
| Comparative Example 2 | 8.4 | 3.8 | 54 |
| Comparative Example 3 | 8.2 | 3.9 | 56 |

As can be seen from Table 1, according to the ink compositions of Examples 1 through 6 using an oligomeric dispersant, both the oligomeric dispersant solution and the ink composition were easily prepared, and separation of layers which was shown in Comparative Examples 1 through 3 was not observed. In addition, according to the Examples 1 through 6, the change in physical properties such as viscosity is not sensitive to a change in the concentration of the dispersant, so that the concentration of the dispersant can be selected in a wide range.

On the other hand, according to the Comparative Examples 1 through 3 using a polymeric dispersant, it was difficult to prepare the polymeric dispersant solution due to its low solubility. Also, it was very difficult to determine the optimum concentration range of the polymeric dispersant to a pigment, and the physical properties of the ink composition changed very sensitively to change in concentration of the polymeric dispersant, which makes it difficult to prepare the ink composition including the polymeric dispersant.

In addition, the storage stability, optical density, bleeding, ejectability, water fastness, light fastness and reliability of the printer head were tested on the ink compositions prepared by the Examples 1 through 6 and Comparative Examples 1 through 3, and the results were tablated as shown in Table 2.

TABLE 2

| class | storage stability | O.D. | bleeding | ejectability | water fastness | light fastness | reliability of printer head |
|---|---|---|---|---|---|---|---|
| Example 1 | ○ | ○ | ○ | ○ | ○ | ○ | ○ |
| Example 2 | ○ | ○ | ○ | ○ | ○ | ○ | ○ |
| Example 3 | ○ | ○ | ○ | ○ | ○ | ○ | ○ |
| Example 4 | ○ | ○ | ○ | ○ | ○ | ○ | ○ |
| Example 5 | ○ | ○ | ○ | ○ | ○ | ○ | ○ |
| Example 6 | ○ | ○ | ○ | ○ | ○ | ○ | ○ |
| Comparative Example 1 | x | Δ | x | x | ○ | ○ | x |
| Comparative Example 2 | x | x | Δ | x | ○ | ○ | Δ |
| Comparative Example 3 | Δ | x | Δ | x | ○ | ○ | x |

As can be seen from Table 2, the ink compositions prepared by Examples 1 through 6 using the oligomer dispersant are improved in view of storage stability and optical density. Also, the number of occurrences of bleeding at the boundaries of each color bar was less, and the ejectability, light fastness and water fastness of the compositions obtained by the Examples 1 through 6 were all good. In addition, kogation is rare even after using an abundant amount of ink.

On the other hand, the ink compositions obtained by the Comparative Examples 1 through 3 were poor in view of optical density, ejectability and bleeding. Also, due to the separation of layers, the storage stability of the compositions was poor and the kogation was distinct.

In addition, the oligomeric dispersant according to the present invention can be easily manufactured when the B and B' portions includes a heteroatom capable of binding with the A portion (anchoring group). Also, such an oligomeric dispersant has good solubility in a solvent, and the physical properties of the ink composition barely changes according to the change in concentration of the oligomeric dispersant, so that the ink composition can be easily prepared.

What is claimed is:

1. An ink composition for an ink jet printer, comprising a coloring agent, a dispersant and a solvent, wherein
    the coloring agent is a pigment and the dispersant is an oligomer represented by the formula BAB',
    at least one of the B and B' portions is a repeating unit and is a hydrophilic group, the B and B' portions being represented by the following formulae (1) and (2) respectively:

$$J_1—(D—E)_a \quad (1)$$
    $$(F—L)_b—J_2 \quad (2)$$

and the A portion is a single component without repetition or a repeating unit, and A is an anchoring group interacting with the pigment represented by the following formula (3)

where E, F, $Y_1$, $Y_2$, $Y_3$, $R_1$, $R_2$, $R_3$ and $R_4$ are independently selected from the group consisting of hydrogen, unsubstituted or substituted $C_1$ to $C_{30}$ aliphatic hydrocarbon group with at least one substituent (G), unsubstituted or substituted $C_1$ to $C_{30}$ heteroaliphatic hydrocarbon group with at least one substituent (G), unsubstituted or substituted sugars with at least one substituent (G), unsubstituted or substituted sorbitan with at least one substituent (G), unsubstituted or substituted $C_6$ to $C_{50}$ aromatic hydrocarbon group with at least one substituent (G), and unsubstituted or substituted steroids with at least one substituent (G)

where D, L, $F_1$, $F_2$, $F_3$ and $F_4$ are independently selected from the group consisting of aliphatic hydrocarbon, aromatic hydrocarbon, —N—, —NH—, —NH$_2$—, —O—, —S—, —O—O—, —S—S—, —C(O)—, —C(S)—, —C(O)—C(O)—, —C(O)—O—, —O—C(O)—, —C(NH)—, —N—C(O)—, —C(O)—N—, —O—C(O)—O—, —N—C(O)—N—, —O—C(O)—N—, —N—C(O)—O—, —O—C(O)—C(O)—O—, —S(O)—, —S(O)(O)—, —S(O)—O—, —O—S(O)—, —S(O)(O)—O—, —O—S(O)(O)—, —S(O)—N—, —N—S(O)—, —S(O)(O)—N—, —N—S(O)(O)—, —O—S(O)—O—, —O—S(O)(O)—O—, —N—S(O)—N—, —N—S(O)(O)—N—, —O—S(O)—N—, —N—S(O)—O—, —O—S(O)(O)—N—, —N—S(O)(O)—O—, —O—S(O)—S(O)—O—, —O—S(O)(O)—S(O)(O)—O—, —N—S(O)—S(O)—N—, —N—S(O)(O)—S—(O)(O)—N—, —P—, —P(O)(OH)—, —O—P(O)(OH)—P(O)(OH)—O—, —O—P(O)(OH)—P(O)(OH)—P(O)(OH)—O—, —O—P(O)(OH)—O—P(O)(OH)—O—, —O—P(O)(OH)—O—P(O)(OH)—O—P(O)(OH)—O— and NH$_4$OH;

where $J_1$ and $J_2$ are independently selected from the group consisting of: hydrogen; aliphatic hydrocarbon group substituted by —OH, —SH, polyol, amine, ammonium halide, ammonium hydroxide, acidic group or alkali salt of the acid; heteroaliphatic hydrocarbon group substituted by —OH, —SH, polyol, amine, ammonium halide, ammonium hydroxide, acidic group or alkali salt of the acid; and aromatic hydrocarbon group substituted by —OH, —SH, polyol, amine, ammonium hydroxide, ammonium halide, acidic group or alkali salt of the acid; and where the substituent (G) of the A, B and B' portions is at least one selected from the group consisting of: unsubstituted or substituted $C_1$ to $C_{20}$ aliphatic hydrocarbon group with oxy group, amino group or thio group; unsubstituted or substituted $C_1$ to $C_{20}$ heteroaliphatic hydrocarbon group with oxy group, amino group or thio group; unsubstituted or substituted $C_6$ to $C_{50}$ aromatic hydrocarbon group with oxy group, amino group or thiol group, halide; —OH; —O—; —SH—; —S—; —CN; —SCN; —NO$_2$; —NH$_2$—; —NH—; —N—; ammonium hydroxide; ammonium halide; —C=NH; —C=N—; amidino group; —N=NH; —N=N—; hydrazone; substituted hydrazone; amide group; substituted amide group; sulfonamide group; carboxyl group (—COOH); alkali salt of carboxylic acid (COO$^-$M$^+$); sulfonic acid (SO$_3$H); alkali salt of the sulfonic acid (SO$_3^-$M$^+$); phosphoric acid (H$_3$PO$_4$); and alkali salt of the phosphoric acid (H$_2$PO$_4^-$M$^+$), where M is an alkaline metal, and k is 0, 1 or 2 depending on the substituent F$_1$, F$_2$, F$_3$ and F$_4$, and the following conditions are satisfied:

$0 \leq a \leq 30$, $0 \leq b \leq 30$, $0 \leq c \leq 30$, $0 \leq d \leq 30$, $0 \leq e \leq 30$ and $0 < a+b+c+d+e < 60$, and wherein the molecular weight of the oligomer is from 300 to about 3,000, and the total amount of dispersant is within the range of from 0.5 to 15 wt. % based on the total weight of the ink composition.

2. The ink composition of claim 1, wherein the A portion of the dispersant is selected from the group consisting of unsubstituted or substituted C$_6$ to C$_{18}$ aliphatic hydrocarbon group with at least one substituent (G), and unsubstituted or substituted C$_6$ to C$_{50}$ aromatic hydrocarbon group with at least one substituent (G), and the B and B' portions are ethyleneglycol having a hetero atom.

3. The ink composition of claim 1, wherein the dispersant is at least one compound selected from the group consisting of ethyleneglycol laurylamine, ethyleneglycol 1,1'-bi-2-naphthylether, ethyleneclycol-2-naphthylamine, ethyleneglycol-1-naphthalene acetamide and ethyleneglycol-N,N'-disopropyl propyl-1,3-diamine and ethyleneglycol benzene sulfonamide.

4. The ink composition of claim 1, further comprising an acid or a base.

5. The ink composition of claim 4, wherein the content of the acid or base is 0.1 to 20 wt % based on the weight of the dispersant.

6. The ink composition of claim 1, wherein the content of the pigment is 0.1 to 20 wt % based on total weight of the ink composition.

7. The ink composition of claim 1, wherein the content of the solvent is 60 to 99.8 wt % based on the total weight of the ink composition.

8. The ink composition of claim 1, wherein the solvent is water or a mixture of water and an organic solvent.

9. The ink composition of claim 8, wherein the content of the organic solvent is 0.1 to 20 wt % based on total weight of the solvent.

10. The ink composition of claim 1, wherein the content of the dispersant is from 0.5 to 5.2 wt. %, based on the total weight of the ink composition.

11. An ink composition for an ink jet printer, consisting essentially of a coloring agent, a dispersant and a solvent, wherein the coloring agent is a pigment and the dispersant is an oligomer represented by the formula BAB', at least one of the B and B' portions is a repeating unit and is a hydrophilic group, the B and B' portions being represented by the following formulae (1) and (2) respectively:

 (1)

 (2)

and the A portion is a single component without repetition or a repeating unit, and A is an anchoring group interacting with the pigment represented by the following formula (3)

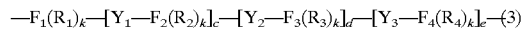 (3)

where E, F, Y$_1$, Y$_2$, Y$_3$, R$_1$, R$_2$, R$_3$ and R$_4$ are independently selected from the group consisting of hydrogen, unsubstituted or substituted C$_1$ to C$_{30}$ aliphatic hydrocarbon group with at least one substituent (G), unsubstituted or substituted C$_1$ to C$_{30}$ heteroaliphatic hydrocarbon group with at least one substituent (G), unsubstituted or substituted sugars with at least one substituent (G), unsubstituted or substituted sorbitan with at least one substituent (G), unsubstituted or substituted C$_6$ to C$_{50}$ aromatic hydrocarbon group with at least one substituent (G), and unsubstituted or substituted steroids with at least one substituent (G)

where D, L, F$_1$, F$_2$, F$_3$ and F$_4$ are independently selected from the group consisting of aliphatic hydrocarbon, aromatic hydrocarbon, —N—, —NH—, —NH$_2$—, —O—, —S—, —O—O—, —S—S—, —C(O)—, —C(S)—, —C(O)—C(O)—, —C(O)—O—, —O—C(O)—, —C(NH)—, —N—C(O)—, —C(O)—N—, —O—C(O)—O—, —N—C(O)—N—, —O—C(O)—N—, —N—C(O)—O—, —O—C(O)—C(O)—O—, —S(O)—, —S(O)(O)—, —S(O)—O—, —O—S(O)—, —S(O)(O)—O—, —O—S(O)(O)—, —S(O)—N—, —N—S(O)—, —S(O)(O)—N—, —N—S(O)(O)—, —O—S(O)—O—, —O—S(O)(O)—O—, —N—S(O)—N—, —N—S(O)(O)—N—, —O—S(O)—N—, —N—S(O)—O—, —O—S(O)(O)—N—, —N—S(O)(O)—O—, —O—S(O)—S(O)—O—, —O—S(O)(O)—S(O)(O)—O—, —N—S(O)—S(O)—N—, —N—S(O)(O)—S—(O)(O)—N—, —P—, —P(O)(OH)—, —O—P(O)(OH)—P(O)(OH)—O—, —O—P(O)(OH)—P(O)(OH)—P(O)(OH)—O—, —O—P(O)(OH)—O—P(O)(OH)—O—, —O—P(O)(OH)—O—P(O)(OH)(OH)—O—P(O)(OH)—O—P(O)(OH)—O— and NH$_4$OH;

where J$_1$ and J$_2$ are independently selected from the group consisting of: hydrogen; aliphatic hydrocarbon group substituted by —OH, —SH, polyol, amine, ammonium halide, ammonium hydroxide, acidic group or alkali salt of the acid; heteroaliphatic hydrocarbon group substituted by —OH, —SH, polyol, amine, ammonium halide, ammonium hydroxide, acidic group or alkali salt of the acid; and aromatic hydrocarbon group substituted by —OH, —SH, polyol, amine, ammonium hydroxide, ammonium halide, acidic group or alkali salt of the acid; and where the substituent (G) of the A, B and B' portions is at least one selected from the group consisting of: unsubstituted or substituted C$_1$ to C$_{20}$ aliphatic hydrocarbon group with oxy group, amino group or thio group; unsubstituted or substituted C$_1$ to C$_{20}$ heteroaliphatic hydrocarbon group with oxy group, amino group or thio group; unsubstituted or substituted C$_6$ to C$_{50}$ aromatic hydrocarbon group with oxy group, amino group or thiol group, halide; —OH; —O—; —SH—; —S—; —CN; —SCN; —NO$_2$; —NH$_2$—; —NH—; —N—; ammonium hydroxide; ammonium halide; —C=NH; —C=N—; amidino group; —N=NH; —N=N—; hydrazone; substituted hydrazone; amide group; substituted amide group; sulfonamide group; carboxyl group (—COOH); alkali salt of carboxylic acid (COO$^-$M$^+$); sulfonic acid (SO$_3$H); alkali salt of the sulfonic acid (SO$_3^-$M$^+$); phosphoric acid (H$_3$PO$_4$); and alkali salt of the phosphoric acid ($H_2PO_4^- M^+$), where M is an alkaline metal, and k is 0, 1 or 2 depending on the substituent $F_1$, $F_2$, $F_3$ and $F_4$, and the following conditions are satisfied:

$0 \leq a \leq 30$, $0 \leq b \leq 30$, $0 \leq c \leq 30$, $0 \leq d \leq 30$, $0 \leq e \leq 30$ and $0 < a+b+c+d+e < 60$, and wherein the molecular weight of the oligomer is from 300 to about 3,000, and the total amount of dispersant is within the range of from 0.1 to 20 wt. % based on the total weight of the ink composition.

12. The ink composition of claim 11, wherein the A portion of the dispersant is selected from the group consisting of unsubstituted or substituted $C_6$ to $C_{18}$ aliphatic hydrocarbon group with at least one substituent (G), and unsubstituted or substituted $C_6$ to $C_{50}$ aromatic hydrocarbon group with at least one substituent (G), and the B and B' portions are ethyleneglycol having a hetero atom.

13. The ink composition of claim 11, wherein the dispersant is at least one compound selected from the group consisting of ethyleneglycol laurylamine, ethyleneglycol 1,1'-bi-2-naphthylether, ethyleneclycol-2-naphthylamine, ethyleneglycol-1-naphthalene acetamide and ethyleneglycol-N,N'-disopropyl propyl-1,3-diamine and ethyleneglycol benzene sulfonamide.

14. The ink composition of claim 11, wherein the content of the dispersant is 0.1 to 20 wt % based on total weight of the ink composition.

15. The ink composition of claim 11, further comprising an acid or a base.

16. The ink composition of claim 15, wherein the content of the acid or base is 0.1 to 20 wt % based on the weight of the dispersant.

17. The ink composition of claim 11, wherein the content of the pigment is 0.1 to 20 wt % based on total weight of the ink composition.

18. The ink composition of claim 11, wherein the content of the solvent is 60 to 99.8 wt % based on the total weight of the ink composition.

19. The ink composition of claim 11, wherein the solvent is water or a mixture of water and an organic solvent.

20. The ink composition of claim 19, wherein the content of the organic solvent is 0.1 to 20 wt % based on total weight of the solvent.

* * * * *